May 31, 1927. 1,630,352
J. N. MORTIMER
WASTE VALVE FOR BATHTUBS AND LAVATORIES
Filed Oct. 18, 1926
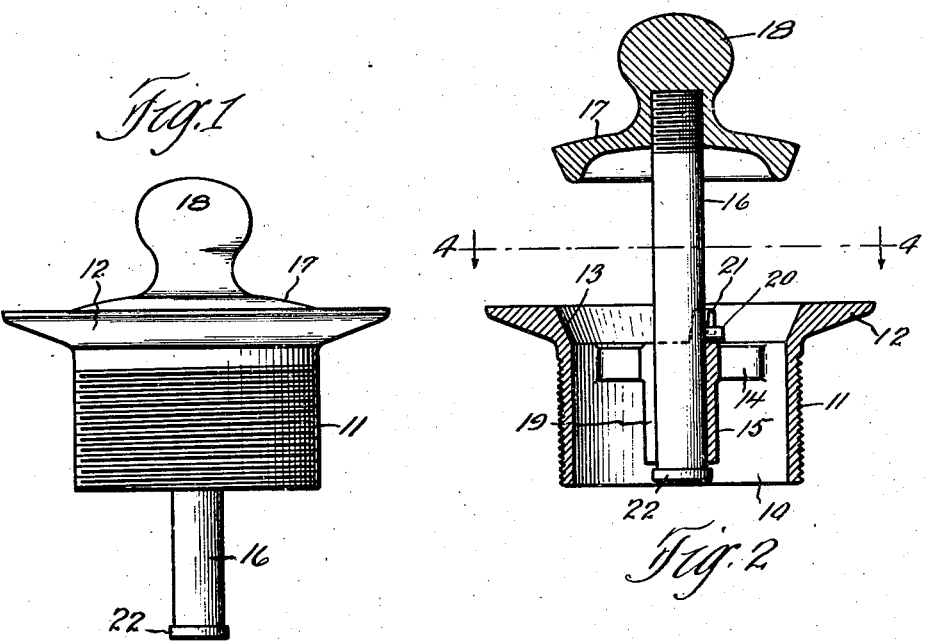
Fig. 1
Fig. 2
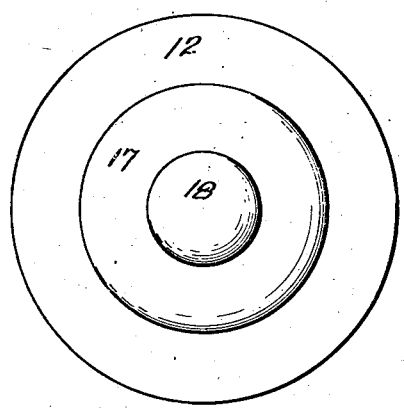
Fig. 3
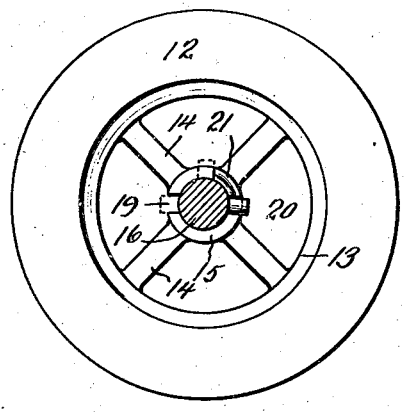
Fig. 4
J. N. Mortimer, Inventor
By Hurr, Brock & West, Attorney Patented May 31, 1927.                                      1,630,352

UNITED STATES PATENT OFFICE.

JOHN N. MORTIMER, OF LAKEWOOD, OHIO, ASSIGNOR TO THE CENTRAL BRASS MANUFACTURING COMPANY, OF CLEVELAND, OHIO, A CORPORATION OF OHIO.

WASTE VALVE FOR BATHTUBS AND LAVATORIES.

Application filed October 18, 1926. Serial No. 142,278. REISSUED

This invention relates generally to a waste valve for bathtubs and lavatories and more particularly to certain improvements of the waste valve disclosed in my application No. 98,088.

The object of the present invention is to provide a waste valve which will take the place of the ordinary chain and stopper in common use and which will completely eliminate the chain which after a period of use becomes more or less unsanitary.

Another object of the invention is to provide a waste valve which can be quickly and easily opened or closed and which can be retained in open position when desired, and another object is to provide a valve which is non-removable and consequently is not likely to be misplaced or stolen. Another and very important object of the invention is to provide for the quick and easy connection of the device to the bathtub without the employment of especially designed tools or technique.

With these various objects in view the invention consists in the details of construction and in the manner of combining or arranging the same all of which will be fully described hereinafter and set forth in the appended claim.

In the drawings forming a part of this specification, Fig. 1 is a side elevation of my improved device ready for insertion into a bathtub or a lavatory; Fig. 2 is a vertical sectional view showing the valve raised or opened; Fig. 3 is a top plan view of the device and Fig. 4 is a sectional plan on the line 4—4 of Fig. 2 and looking downwardly.

In carrying out my invention I employ a metallic ring 10 externally threaded at 11 and provided with an outwardly extending annular flange 12 at the upper end thereof and a tapering valve seat 13. This threaded and flanged ring is screwed through the bathtub opening into the drain elbow and the flange 12 seats into a recess usually provided for the same so that the top of the ring is flush with the bottom of the bathtub.

The ring 10 is formed with a spider 14 having a centrally bored hub 15 and working up and down in this hub is a stem 16 of the valve 17, said valve being sized and shaped to fit snugly upon the seat 13. This valve is also provided with any suitable form of knob 18 or other means, by means of which it can be manipulated.

In the drawing I have shown the stem 16 threaded into the valve 17 but it will of course be understood that it can be made integral therewith if so desired. The hub 15 is slotted vertically as shown at 19 and the stem 16 is provided with a laterally projecting pin 20 which moves up and down in the slot 19 when the valve is being raised and lowered and in order to maintain the valve in an open position it is given a turn in either direction after the pin 20 has been moved clear of the hub and this hub is provided with a stop 21 against which the pin 20 is adapted to contact to limit the rotary movement of the valve. This lug or projection 21 is so positioned that the valve when raised can be turned in either direction to effect the locking of the valve in its raised position.

The stem is provided with a stop collar 22 to prevent the stem being withdrawn from the hub. This stop collar can be made an integral part of the stem or it can be attached thereto and may be either a complete collar or merely a lateral projection so long as the same is of such size as to prevent withdrawal.

The stem 16 is of such length and the pin 20 is so positioned thereon that when the valve is completely opened, there is ample space between the valve and ring to insert a screw driver or any other suitable tool for the purpose of turning the ring to screw the same into the bathtub or lavatory without injuring in any manner the valve or seat. This eliminates the formation of the ring in any peculiar manner and also eliminates the use of special tools or technique for the placement and securing of the device in the bathtub or lavatory. The valve stem, while being of such length as to elevate the valve sufficiently for the introduction of the screw driver or other tool is not sufficiently long to contact with the bottom of the drain elbow nor will it interfere with the free exit of the water.

In order to close the valve it is only necessary to turn the stem until the pin 20 is in register with the groove 19 and then permit the valve to drop upon its seat. To open the valve it is only necessary to lift the same vertically and give the stem a turn in either direction until the pin 20 contacts with the stop lug or projection 21.

It will thus be seen that I provide an exceedingly cheap, simple and efficient form of waste valve which will effectively carry out all of the objects hereinbefore recited.

Having thus described my invention, what I claim is:

As a new article of manufacture, a waste valve for bathtubs comprising an externally threaded sleeve provided at its upper end with an outwardly extending flange, said sleeve having a valve seat at its upper end, a centrally disposed spider having a longitudinally slotted hub, said hub having an upwardly projecting stop lug, and a valve provided with a stem, said stem having a laterally projecting pin intermediate its ends and a laterally projecting stop at its lower end, the length of said stem being such as to hold the valve elevated a sufficient distance above the spider to permit a tool to be brought into engagement with said spider for the purpose of screwing the sleeve into the bathtub.

In testimony whereof, I hereunto affix my signature.

JOHN N. MORTIMER.